United States Patent [19]

Kapadia et al.

[11] Patent Number: 5,438,569
[45] Date of Patent: Aug. 1, 1995

[54] TRANSCODER

[75] Inventors: Mayank Kapadia, Swindon; Graham Johnson, Marlborough; Barry M. King, Swindon, all of United Kingdom

[73] Assignee: Motorola, Inc., Schaumburg, Ill.

[21] Appl. No.: 152,513

[22] Filed: Nov. 16, 1993

[30] Foreign Application Priority Data

Nov. 28, 1992 [GB] United Kingdom ............... 9224974

[51] Int. Cl.6 .................... H04L 12/66; H04B 7/24
[52] U.S. Cl. ........................... 370/79; 370/95.1; 370/110.1; 379/58; 379/229
[58] Field of Search ............. 370/95.1, 95.2, 95.3, 370/110.1, 79, 50, 70; 379/58, 59, 63, 229, 230, 240; 455/33.1, 53.1, 54.1, 55.1

[56] References Cited

U.S. PATENT DOCUMENTS

| | | | |
|---|---|---|---|
| 4,754,453 | 6/1988 | Eizenhöfer | 370/95.1 |
| 5,111,454 | 5/1992 | Hung et al. | 370/95.3 |
| 5,228,029 | 7/1993 | Kotzin | 370/95.1 |

FOREIGN PATENT DOCUMENTS 0497083 12/1991 European Pat. Off.
2174571 10/1985 United Kingdom.

Primary Examiner—Wellington Chin
Attorney, Agent, or Firm—Raymond J. Warren

[57] ABSTRACT

A transcoder is described for performing transcoding operations, that is to say coding and decoding operations on voice data arranged over a plurality of voice data channels. It comprises a first interface (10) for inputting and outputting coded voice data, a second interface (11) for inputting and outputting decoded voice data; at least one transcoder processor (101) for performing transcoding operations on voice data arranged over at least two voice data channels; and an input/output processor (100) coupled to the first and second interfaces and the at least one transcoder processor for controlling the flow of data between the first and second interfaces and the at least one transcoder processor. The input/output processors controls the at least one transcoder processor to perform transcoding operations on a selected channel at a given time. The invention is particularly applicable to transcoding between CEPT standard voice data and GSM standard voice data.

9 Claims, 4 Drawing Sheets

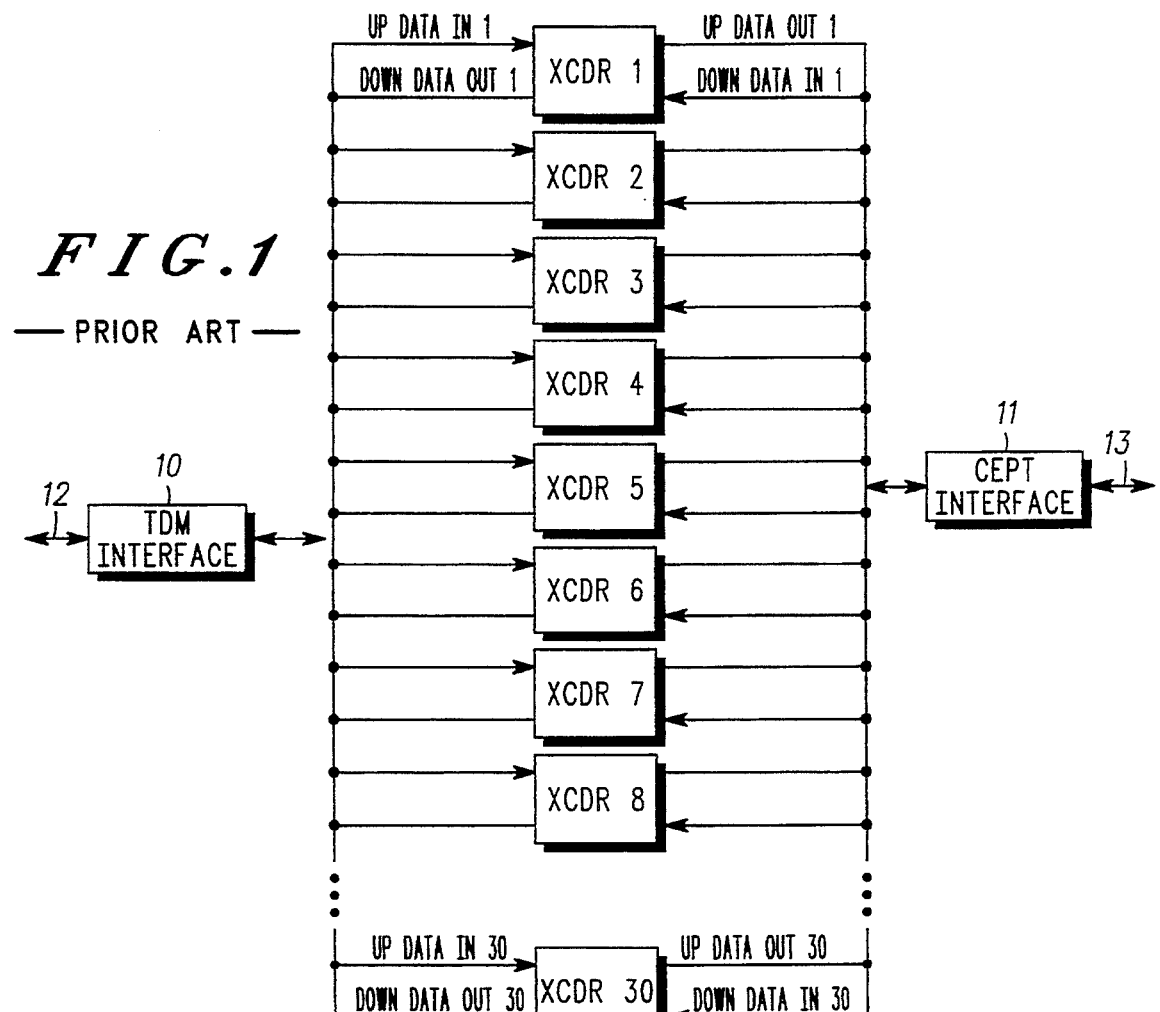
FIG.1 — PRIOR ART —
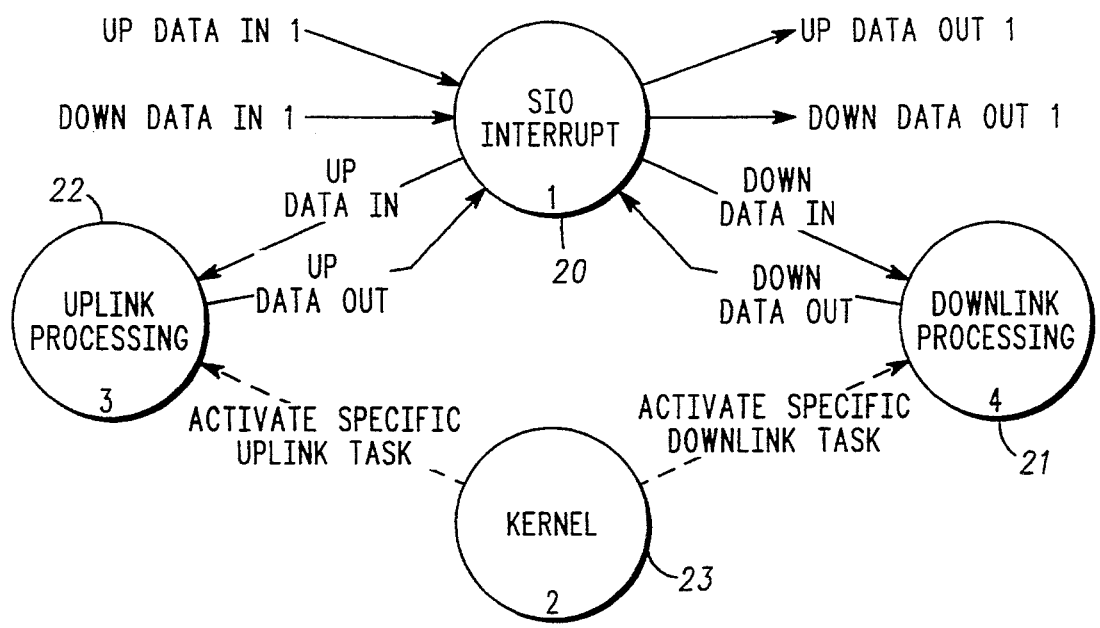
FIG.2 — PRIOR ART —

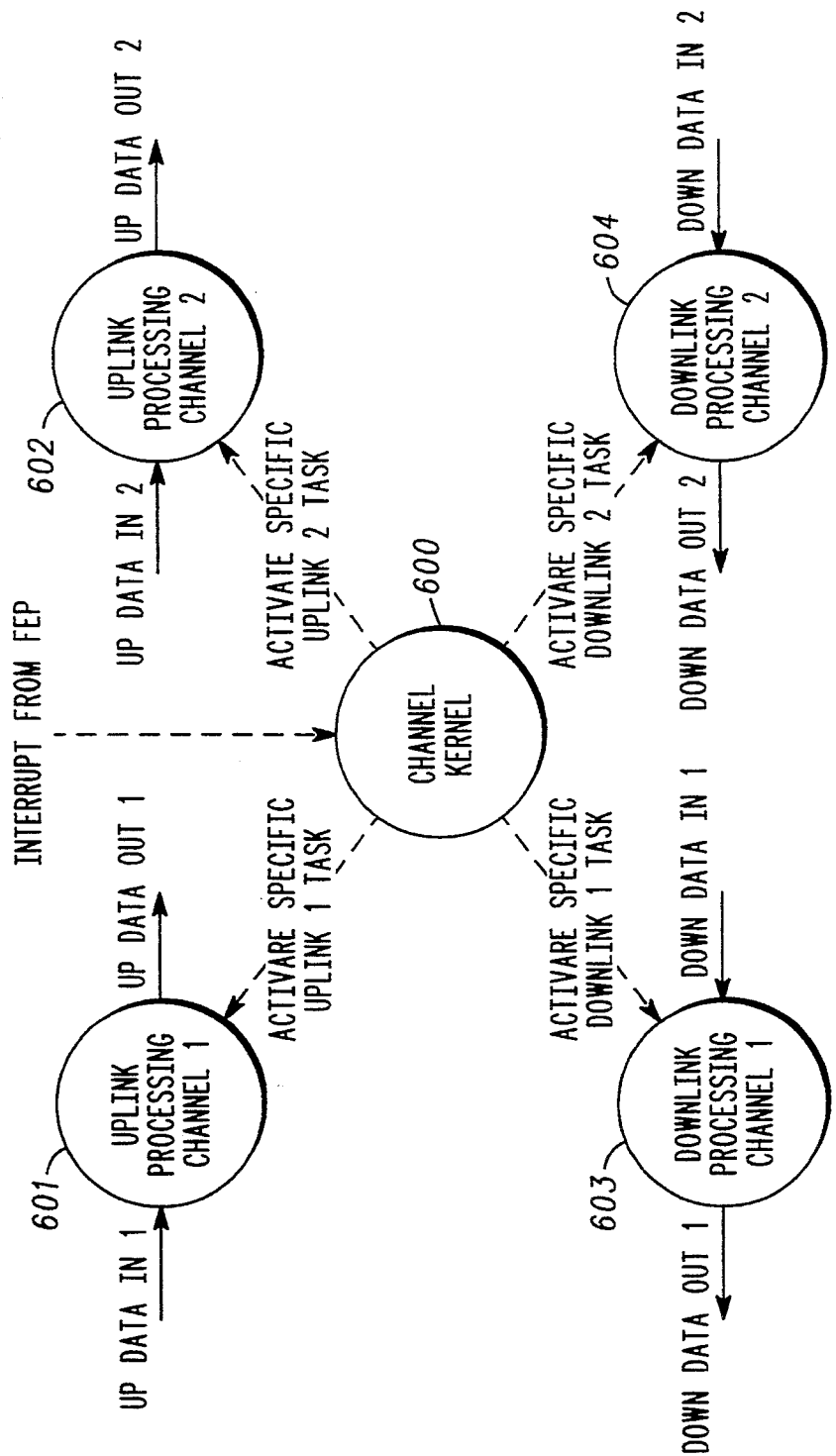

TRANSCODER

FIELD OF THE INVENTION

This invention relates to a transcoder for performing transcoding operations, that is to say coding and decoding operations on voice data arranged over a plurality of voice data channels. The invention is particularly applicable to transcoding between CEPT standard voice data and GSM standard voice data.

BACKGROUND AND SUMMARY OF THE PRIOR ART

FIG. 1 shows a transcoder board of a Motorola GSM cellular radio base station system. The board supports 30 traffic channels and provides interfaces between a time division multiplex highway on the cellular radio side and a 2.048 Mbit/s serial CEPT link on the telephone switch side. TDM interface 10 and CEPT interface 11 respectively provide the inputs and outputs for coded and decoded voice respectively on the cellular radio side and the switch side respectively. Each traffic channel is realised using a 40 MIP/80 MHz digital signal processor labelled XCDR1-XCDR30. A TDM highway 12 on the left of the figure carries GSM compressed speech information (or for a data call, rate adapted data) and a CEPT link 13 on the right carries uncompressed speech information (or, for a data call, rate adapted data). The direction TDM to CEPT is called the uplink and the direction CEPT to TDM is called the downlink.

FIG. 2 shows a simplified first level decomposition of the architecture of one of the transcoders (e.g. XCDR1) of FIG. 1. The four functions represented by bubbles 20, 21, 22, and 23 are necessary to support the transcoding required by one single traffic channel. An SIO interrupt 20 performs the functions specified in GSM 08.60 and is activated every 125 microseconds interrupt. The uplink bubble 22 represents all the processing required to perform the GSM speech decoding specified in GSM 06.10 and the uplink GSM discontinuous transmission functions specified by GSM 06.31. It also performs, for a data call, rate adaption functions as per GSM 08.20. The downlink bubble 21 represents all the processing required to perform the GSM speech encoding specified in GSM 06.10 and the downlink GSM discontinuous transmission functions specified by GSM 06.31. It also represents, for a data call, rate adaptation functions as per GSM 08.20. The kernel bubble 23 comprises routines to schedule the uplink and downlink tasks in the order specified in GSM 06.10, GSM 08.60 GSM 03.05 and GSM 06.31, and for a data call, GSM 08.20, GSM 08.60 and GSM 03.05. The kernel times itself from the interrupts that the SIO 20 receives every 125 microseconds and allocates a downlink to uplink time slicing mechanism of 2-1. This provides two consecutive 125 microsecond timeslots for downlink processing followed by one timeslot for uplink processing.

It is a draw back that the SIO 20 reduces the amount of time left for the other three bubbles to such an extent that one DSP is required per traffic channel. Thus, the requirement for 30 DSPs on a single transcoder board to support 30 channels makes the equipment very expensive.

The 2-1 time slicing mechanism has two main flaws. First, a subchannel may be given an opportunity to execute even if there are no tasks available for that subchannel to perform. Second, if a subchannel's task completes before the end of the timeslot allocated to it, no other task may be performed in the remaining time, which therefore becomes idle or wasted. The fixed time slicer prohibits one subchannel's task from being executed during the other subchannel's time slice period.

There is a need for an improved transcoder.

SUMMARY OF THE INVENTION

According to the present invention, a transcoder is provided for performing transcoding operations on voice data arranged over a plurality of voice data channels, comprising a first interface for inputting and outputting coded voice data; a second interface for inputting and outputting decoded voice data; at least one transcoder processor for performing transcoding operations on voice data arranged over at least two voice data channels; an input/output processor coupled to the first and second interfaces and the at least one transcoder processor for controlling the flow of data between the first and second interfaces and the at least one transcoder processor, whereby the input/output processor controls the at least one transcoder processor to perform transcoding operations on a selected channel at a given time.

A transcoder according to the invention provides a more efficiently organised architecture in which the at least one transcoder processor, of which there may be many (e.g. four) is controlled by the input/output processor to perform transcoding operations for more than one channel.

It is found that five DSPs can readily be used to perform transcoding operations for eight channels, representing a ⅔ reduction in the number of processors required. The thirty DSPs of FIG. 1 can be replaced with 20 DSPs using the preferred new architecture.

| Glossary of Abbreviations | |
|---|---|
| CEPT | Committee European des Posts et Telecommunications |
| DSP | Digital Signal Processor |
| FEP | Front End Processor |
| GSM | Groupe Speciale Mobile - i.e. Pan-European Digital Cellular Standard |
| TDM | Time Division Multiplex |
| SIO | Serial Input/Output |
| XCDR | Transcoder |
| XDSP | Transcoder DSP |

BRIEF DESCRIPTION OF THE DRAWINGS

FIG. 1 shows a block diagram of a prior art transcoder board;

FIG. 2 shows a data flow overview of the processing functions of a single XCDR DSP of FIG. 1;

FIG. 6 shows a data flow overview diagram of the preferred operation of each of the XDSPs of FIG. 3.

DETAILED DESCRIPTION OF THE PREFERRED EMBODIMENT

Figure 3:
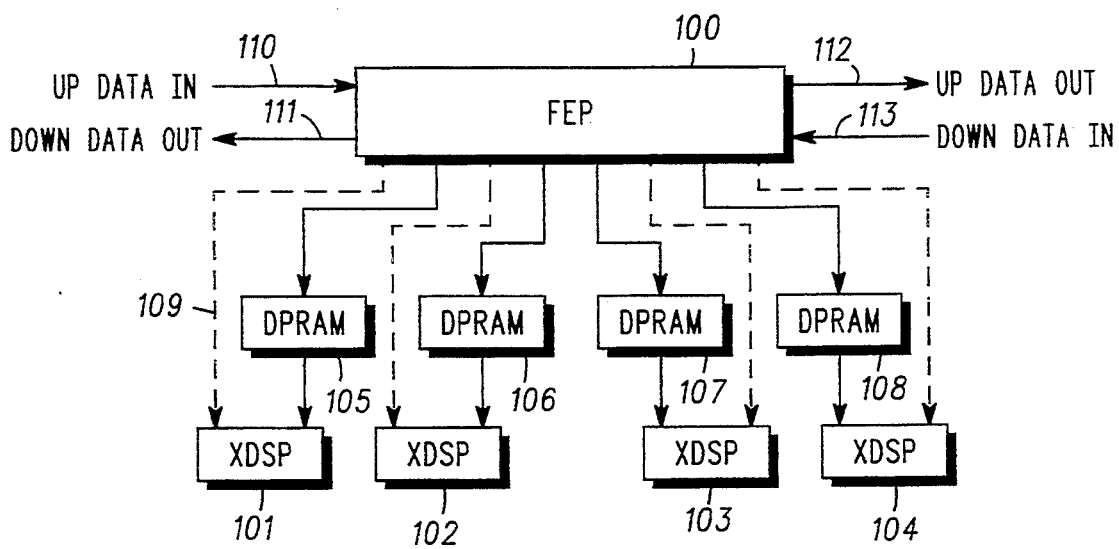
FIG. 3 shows a block diagram of transcoder circuitry in accordance with the present invention.

Referring to FIG. 3, a transcoder circuit is shown comprising a front end processor (FEP) 100 and four transcoder DSPs 101, 102, 103 and 104. Between the FEP 100 and each of the XDSPs are connected dualport random access memories (DPRAMs) 105, 106, 107 and 108 connected to the DSPs 101–104 respectively. In the diagram, the solid lines represent flow of data and the broken lines 109 represent control of the XDSPs 101–104 by the FEP 100.

All four DSPs 100–104 are 40 MIP/80 MHz DSPs, such as Motorola's 56000 series. Each of the DPRAMs 105–108 is 2K×8 bits wide.

The FEP 100 interfaces to a TDM interface such as interface 10 of FIG. 1 and a CEPT interface such as interface 11 of FIG. 1. The FEP 100 performs the uplink and downlink input and output for all the eight channels supported. The broken lines 109 represent the need for interrupts in the direction shown, i.e. from the FEP 100 to each XDSP 101–104. The remaining interactions shown involve the DPRAMs 105–108 and these interactions are explained in relation to FIG. 4.

Figure 4:
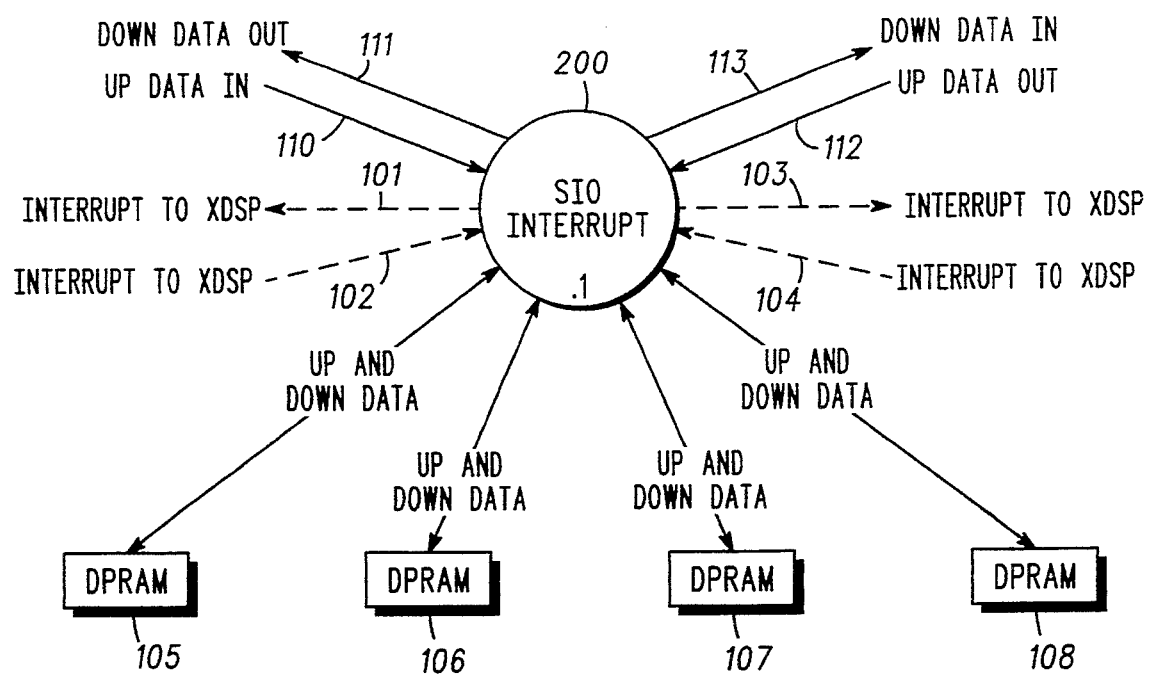
FIG. 4 shows a data flow overview diagram illustrating the preferred operation of the FEP DSP of FIG. 3.

Referring to FIG. 4, the DPRAMs 105–108 of FIG. 3 are illustrated and a bubble 200 is shown representing the functions performed by the FEP 100. These are explained in greater detail below with respect to FIG. 5.

In FIG. 4, flow lines 110 and 111 are shown illustrating the down data output and the up data input corresponding to the same flow lines shown in FIG. 3 and flow lines 112 and 113 are shown illustrating the down data input and the up data output corresponding to the same flow lines in FIG. 3.

The SIO interrupt program 200 performs serial input and output for the eight traffic channels that the four DSPs 101–104 are to use. The SIO interrupt program 200 only interrupts the processors 101–104 when blocks of input data are available for processing. In the downlink direction a block of data passing between the FEP and the DPRAM is 160 bytes of uncompressed speech. Other blocks of data between the memory and the FEP and DSP processors are variable. This contrasts with prior arrangements where an interruption was carried out every SIO interrupt. Each XDSP 101–104 now performs the uplink, downlink and kernel tasks for two traffic channels.

The FEP SIO 200 has two principle functions to perform. It must transfer the TDM/CEPT data to/from the appropriate DPRAM of FIG. 3 every interrupt and it must support eight channels (as opposed to only one in the prior art). The FEP 100 accomplishes this by means of an outer loop around an inner subroutine as shown in FIG. 5.

Figure 5:
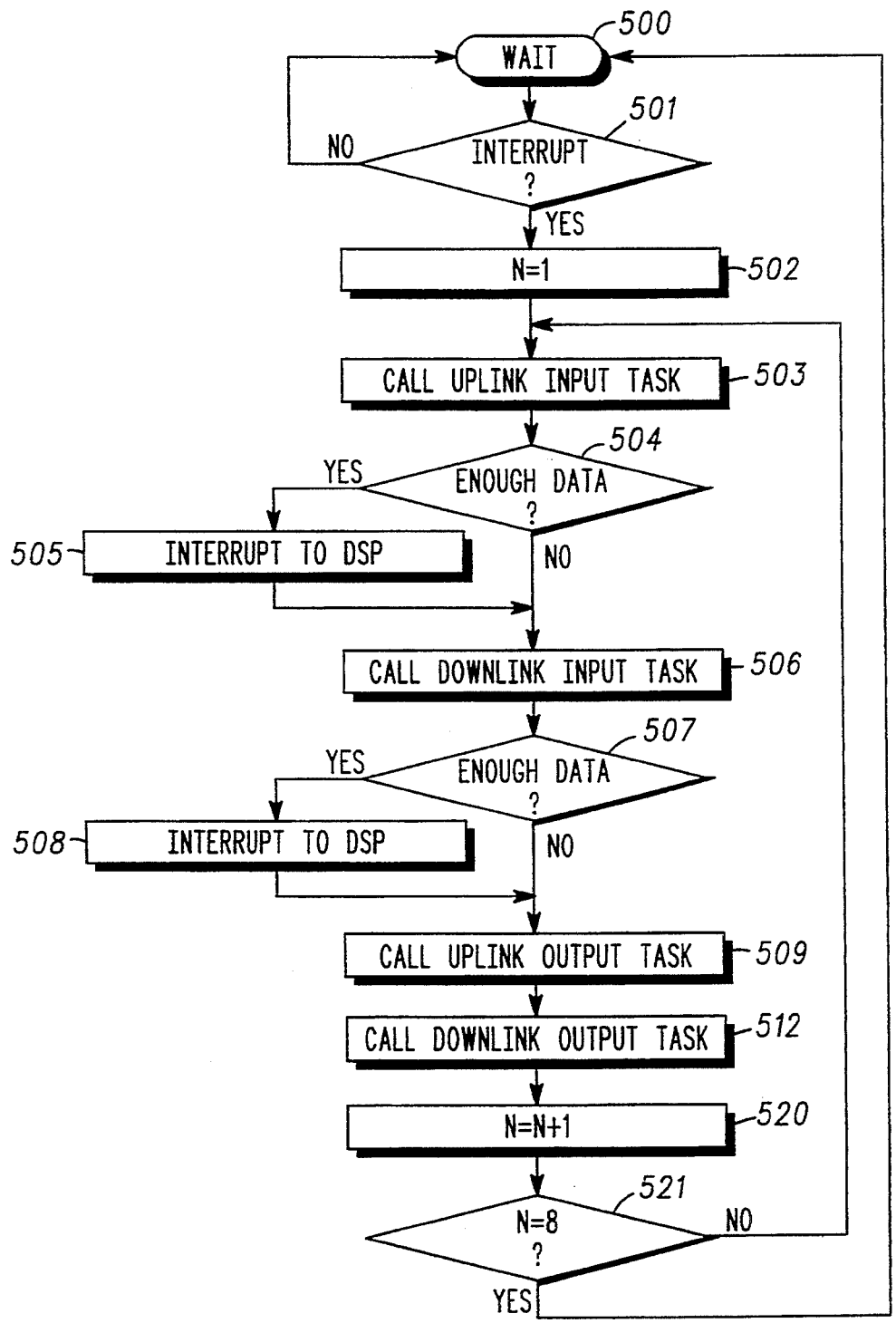
FIG. 5 shows a flow diagram of the preferred operation of the SIO interrupt program of FIG. 4.

Referring to FIG. 5, a continuous serial IO interrupt routine is shown which makes up the data flow bubble 200 of FIG. 4.

Commencing at step 500, the program waits for an interrupt from either the TDM interface 10 or the CEPT interface 11. Upon receipt of an interrupt (step 501), the program passes to step 502 where a counter N is set to 1. This counter represents the channel number. The program is now set to initiate transcoding for eight channels serially from one to eight. After step 502, the uplink input task is called (step 503), that is to say data is read from uplink data input line 110. If step 504 determines that there is enough data for transcoding of a complete block, an interrupt is generated in step 505 which (when N=1 or 2) is sent to XDSP 101. GSM 08.60 provides an explanation of the block size needed before an interrupt is generated in step 505. When N=3 or 4, the interrupt is passed to DSP 102 and so on for N=5 to 8. If there is insufficient data, the program passes directly from step 504 to step 506 and the downlink input task is called, that is to say data is read from flow line 113. If there is sufficient data for processing, i.e. 160 bytes of uncompressed speech (step 507), an interrupt is again sent to DSP 101 (step 508). In a similar manner, the program passes through steps 509 to 512 in which uplink data is output on flow line 112 and downlink data is output on flow line 111. The program eventually passes to step 520, at which the counter N is incremented for processing of channel 2. The program passes from step 521 to step 503 and steps 503 to 512 are repeated for channel 2. Again any interrupts generated are passed to XDSP 101.

Upon the next incrementation of the counter, steps 503 to 512 input and output data to and from DPRAM 106 and generate interrupts for XDSP 102. Similarly, when N=4 or 5, data is read to and from DPRAM 107 and interrupts are generated for XDSP 103 and when N=7 or 8, data is read to and from DPRAM 108 and interrupts are generated for XDSP 104.

Finally when N=8, the program returns to step 500, where it waits for the next interrupt and the complete program is repeated.

In this manner, blocks of data are built up in the various memories 105–108 and when there is sufficient data for a transcoder task to be performed, that task is initiated in the respective transcoder DSP 101–104. Similarly, when a transcoder has completed its task and presented a complete frame of data to one of the memories 105–108, this data is ready for outputting on line 111 or 112.

Referring now to FIG. 6, an overall flow diagram is shown illustrating the operation of transcoder DSP 101. This transcoder performs the voice coding (down link) and decoding (up link) operations for channel 1 and channel 2. In the FIG. "1" and "2" represent the respective channels. The kernel 600 controls overall task management, receiving interrupts from steps 505, 508 of FIG. 5. There are four processing bubbles 601–604 representing the up link processing for channels 1 and 2 and the down link processing for channels 1 and 2 respectively. Bubble 601 contains a voice decoding program as is known in the art and bubble 603 contains a voice coding program as is known in the art. Bubbles 602 and 604 contain identical programs to bubbles 601 and 603, but operate on different blocks of data representing different channels.

The order in which SIO interrupt 200 schedules up link and down link tasks is as set out in GSM 06.10, GSM 03.05 and GSM 06.31 and GSM 08.60.

In the arrangement described, there is no fixed time slicer to prohibit one subchannel's task from being executed during another subchannel's time slice period, as there are no allocated up link and down link time slices. It is up to the SIO interrupt 200 to determine if enough data is available to schedule the next task from each subchannel. Cases where no more data is required to schedule the next task of any given subchannel are dealt with in the same way as cases where tasks from two or more subchannels are ready for execution at the same time. The kernel is designed to allow only one task to be executed from each subchannel at a time, after which the kernel decides whether the next subchannel in sequence has any tasks to run and executes it accordingly. Whereas the prior art kernel 23 of FIG. 2 determines the number of subchannels tasks pending by monitoring pointers that are maintained by the SIO which indicate the frame position of the uplink and downlink input data, in the new design, the kernel includes an interrupt processing routine the task of which is to use the information in the interrupt from the FEP together with the knowledge of the number of tasks already executed for the current frame and subchannel to maintain a count of the number of tasks pending for the current frame for each subchannel.

Simulations have shown that using 5 DSPs in such a manner makes it possible to support the transcoding of 8 traffic channels, which would otherwise require 8 DSPs. It can also be deduced from simulations that it would not have been possible to support the transcoding of more than one channel using a single DSP by itself.

The arrangement has the advantage of using fewer expensive digital signal processors. A slower (less expensive) processor can be used for the front end processor 100 and faster (more expensive) processors for the transcoder DSPs 101–104, thus giving a further saving. Alternatively, additional processing capacity thus released can be used for more complex transcoder processors, such as the forthcoming GSM half rate codec.

Modifications can readily be made by one skilled in the art. Thus, for example, instead of allocating two channels to each of the DSPs 101–104, if a DSP of sufficient capacity is available, it may be possible to allocate 3 or 4 channels to each DSP. Alternatively, the allocation of channels to particular DSPs can be dynamic so that any available DSP performs any required task at a given time, provided always that all the necessary channel parameters for a particular channel are available to the DSP that is assigned to that channel. This arrangement would provide a degree of robustness in that the failure of one DSP would not preclude the use of a particular channel.

As a further alternative arrangement, selected DSPs (e.g. DSP 101 and DSP 102) can be arranged to perform coding operations and selected other DSPs (e.g. DSP 103 and DSP 104) can be arranged to perform decoding operations.

We claim:

1. A transcoder for performing transcoding operations on voice data arranged over a plurality of voice data channels, comprising
    a first interface for inputting and outputting coded voice data;
    a second interface for inputting and outputting decoded voice data;
    a plurality of transcoder processors for performing transcoding operations on voice data arranged over a plurality of voice data channels;
    an input/output processor coupled to the first and second interfaces and the plurality of transcoder processors for controlling the flow of data between the first and second interfaces and the plurality of transcoder processors, whereby the input/output processor controls each of the plurality of transcoder processors to perform transcoding operations on a selected voice data channel at a given time.

2. A transcoder according to claim 1, comprising memory means associated with the plurality of transcoder processors for buffering data between the plurality of transcoder processors and the input/output processor.

3. A transcoder according to claim 1, further comprising interrupt coupling means for interruption of the operation an individual transcoder processor of the plurality of transcoder processors by the input/output processor.

4. A transcoder according to claim 1 wherein the transcoder processor is arranged to perform coding and decoding operations for data arranged over the plurality voice data channels.

5. A transcoder according to claim 1 comprising a plurality of transcoder processors, wherein the input/output processor is arranged to control transcoding tasks of the plurality of transcoder processors on a round-robin basis.

6. A transcoder according to claim 1 comprising a plurality of transcoder processors arranged to transcode between CEPT standard voice data and GSM standard voice data over the plurality of voice data channels.

7. A transcoder according to claim 1, wherein each of the plurality of transcoder processors is a relatively high speed processor and the input/output processor is a relatively low speed processor.

8. A transcoder for performing coding and decoding operations on a plurality of voice data channels, comprising:
    a first interface for inputting and outputting coded voice data;
    a second interface for inputting and outputting decoded voice data;
    a first processor for controlling input and output flow of voice data in the first and second interfaces;
    a plurality of further processors coupled to the first processor for receiving data and interrupts therefrom and passing data thereto; and
    memory means associated with each of the further processors for buffering data between the first processor and the further processors, whereby each of the further processors is controlled by the first processor to perform coding and/or decoding operations for more than one channel.

9. A transcoder for performing transcoding operations on a voice data stream arranged over a plurality of voice data channels, comprising
    a first interface for inputting and outputting coded voice data;
    a second interface for inputting and outputting decoded voice data;
    a transcoder processor for performing transcoding operations on the voice data stream arranged over a plurality of voice data channels; and
    an input/output processor coupled to the first and second interfaces and the transcoder processor for controlling the flow of data between the first and second interfaces and the transcoder processor, whereby the input/output processor controls the transcoder processor to perform transcoding operations on a selected voice data channel of said plurality of voice data channels at a given time.

* * * * *